(12) United States Patent
Wells (10) Patent No.: US 11,738,858 B2
(45) Date of Patent: Aug. 29, 2023

(54) LANDING GEAR SYSTEM UPLOCK ARRANGEMENT

(71) Applicant: AIRBUS OPERATIONS LIMITED, Bristol (GB)

(72) Inventor: Craig Wells, Bristol (GB)

(73) Assignee: Airbus Operations Limited, Bristol (GB)

( * ) Notice: Subject to any disclaimer, the term of this patent is extended or adjusted under 35 U.S.C. 154(b) by 140 days.

(21) Appl. No.: 17/296,054

(22) PCT Filed: Mar. 12, 2020

(86) PCT No.: PCT/EP2020/056664
§ 371 (c)(1),
(2) Date: May 21, 2021

(87) PCT Pub. No.: WO2020/182946
PCT Pub. Date: Sep. 17, 2020

(65) Prior Publication Data
US 2021/0394891 A1    Dec. 23, 2021

(30) Foreign Application Priority Data

Mar. 12, 2019 (GB) ..................................... 1903374

(51) Int. Cl.
*B64C 25/28* (2006.01)
(52) U.S. Cl.
CPC .................................... *B64C 25/28* (2013.01)
(58) Field of Classification Search
CPC .................................................... B64C 25/28
See application file for complete search history.

(56) References Cited

U.S. PATENT DOCUMENTS

| 5,288,037 A | * | 2/1994 | Derrien | ............... | E05B 47/0607 |
| | | | | | 294/82.3 |
| 7,883,125 B2 | * | 2/2011 | Smith, III | ................. | E05C 3/24 |
| | | | | | 292/201 |

(Continued)

FOREIGN PATENT DOCUMENTS

| EP | 1 648 765 | 4/2006 |
| EP | 3 931 082 | 1/2022 |

(Continued)

OTHER PUBLICATIONS

Combined Search and Examination Report for GB Application No. 1903374.5 dated Aug. 22, 2019, 5 pages.

(Continued)

Primary Examiner — Justin M Benedik
(74) Attorney, Agent, or Firm — Nixon & Vanderhye P.C.

(57) ABSTRACT

A landing gear system uplock arrangement (300, 500) including: a hook (310) defining a gap (314), wherein the hook is movable between a first position, at which the hook is for retaining a movable element (299, 499) of a landing gear system in the gap, and a second position, at which the hook is for permitting movement of the element into and out from the gap; a lock (320) that is changeable between a locked state, in which the lock prevents movement of the hook from the first position to the second position, and an unlocked state, in which the lock permits movement of the hook from the first position to the second position; and a sensor arrangement (330) for sensing whether the element is present in the gap.

20 Claims, 2 Drawing Sheets

(56) References Cited

U.S. PATENT DOCUMENTS

| | | | | |
|---|---|---|---|---|
| 8,109,465 B1* | 2/2012 | Heer | ............... | B64C 25/26 |
| | | | | 244/102 R |
| 8,567,716 B2* | 10/2013 | Schmidt | ............ | B64C 25/26 |
| | | | | 244/102 R |
| 2003/0164421 A1* | 9/2003 | Collet | ............. | B64C 25/26 |
| | | | | 244/102 R |
| 2003/0164422 A1* | 9/2003 | Collet | ............. | B64C 25/26 |
| | | | | 244/102 R |
| 2006/0208501 A1* | 9/2006 | Harvey | ............ | B64C 25/26 |
| | | | | 292/201 |
| 2009/0284025 A1* | 11/2009 | Salcombe | ...... | E05B 47/0607 |
| | | | | 292/201 |
| 2022/0126986 A1 | 4/2022 | Gleave et al. | | |

FOREIGN PATENT DOCUMENTS

| | | |
|---|---|---|
| GB | 2460088 | 11/2009 |
| GB | 2561383 | * 10/2018 |
| WO | 2005/005252 | 1/2005 |
| WO | 2018/189299 | 10/2018 |
| WO | 2020/180520 | 9/2020 |
| WO | 2021/074348 | 4/2021 |
| WO | 2021/074349 | 4/2021 |

OTHER PUBLICATIONS

International Search Report and Written Opinion of the ISA for PCT/EP2020/056664 dated Jul. 8, 2020, 14 pages.
International Search Report cited in GB2112388.0 dated Feb. 17, 2022, five pages.

* cited by examiner

LANDING GEAR SYSTEM UPLOCK ARRANGEMENT

RELATED APPLICATION

This application is the U.S. national phase of International Application PCT/EP2020/056664 filed Mar. 12, 2020, which designated the U.S. and claims priority to United Kingdom patent application 1903374.5 filed Mar. 12, 2019, the entire contents of each of which applications are hereby incorporated by reference.

TECHNICAL FIELD

The present invention relates to landing gear system uplock arrangements, and to landing gear systems and aircraft comprising such uplock arrangements.

BACKGROUND

In some known aircraft, a landing gear is held in an extended position when the aircraft is on the ground and is stowed at a retracted position in a landing gear bay once the aircraft has taken off. Such stowage of the landing gear helps to reduce aircraft drag and noise and the risk of the landing gear being damaged in flight. The landing gear subsequently is extended to the extended position again before the aircraft lands. Movement of the landing gear is typically controlled by a pilot using cockpit flight controls of the aircraft, such as a landing gear control lever.

One or more landing gear bay doors may be employed to at least partially cover the landing gear bay when the landing gear is in the retracted position, and in some cases when the landing gear is in the extended position. A landing gear bay door is movable between a closed position, at which the landing gear bay door at least partially covers the landing gear bay, and an open position, at which the landing gear is movable between the extended and stowed positions. In some aircraft, the landing gear bay door is opened prior to movement of the landing gear between the retracted position and the extended position, and closed again once the landing gear has reached the desired extended or retracted position. In other aircraft, the landing gear bay door is driven by movement of the landing gear.

During flight, it is known for the landing gear to be held in the retracted position by a landing gear uplock arrangement, and for one or more landing gear actuators used for actuating the landing gear to be depressurised until the landing gear is to be extended to the extended position again before the aircraft lands. The landing gear uplock arrangement is to prevent the landing gear from resting on the landing gear bay door(s) when the landing gear actuators are depressurised.

Moreover, during flight, the landing gear bay door may be held in the closed position by a landing gear bay door uplock, and one or more landing gear bay door actuators used for moving the landing gear bay door may be depressurised until the landing gear bay door is to be moved to the open position. The landing gear bay door uplock prevents the landing gear bay door from opening when the landing gear bay door actuators are depressurised.

SUMMARY

A first aspect of the present invention provides a landing gear system uplock arrangement, comprising: a hook defining a gap, wherein the hook is movable between a first position, at which the hook is for retaining a movable element of a landing gear system in the gap, and a second position, at which the hook is for permitting movement of the element into and out from the gap; a lock that is changeable between a locked state, in which the lock prevents movement of the hook from the first position to the second position, and an unlocked state, in which the lock permits movement of the hook from the first position to the second position; and a sensor arrangement for sensing whether the element is present in the gap.

Optionally, the hook is rotatable between the first and second positions.

Optionally, the uplock arrangement comprises a hook biasing device that is configured to bias the hook to the second position.

Optionally, the uplock arrangement comprises a member that is movable relative to the gap by the element when the element is in the gap.

Optionally, the member is rigid.

Optionally, the member is rotatable relative to the gap by the element when the element is in the gap.

Optionally, the uplock arrangement comprises a member biasing device that is configured to bias the member relative to the gap.

Optionally, the member comprises a first portion and a second portion on respective sides of a member pivot about which the member is rotatable, wherein the first portion of the member is able to protrude into the gap or be aligned with or overly the gap, and wherein the member biasing device is engaged with the second portion of the member.

Optionally, the uplock arrangement comprises a stop that is configured to limit a degree to which the member is able to move relative to the gap.

Optionally, the member comprises a first portion and a second portion on respective sides of a member pivot, wherein the first portion of the member is able to protrude into the gap or be aligned with or overly the gap, and wherein the stop is configured to act on the first portion of the member.

Optionally, the member is operatively connected to the lock so that movement of the member relative to the gap causes operation of the lock.

Optionally, the member is connected to the lock by a link. Optionally, the link is pivotally connected to the member and pivotally connected to the lock. Optionally, the link is a rigid link.

Optionally, the member is operatively connected to the lock so that movement of the member in a direction away from the gap causes the lock to change to the locked state.

Optionally, the sensor arrangement is for sensing whether the element is present in the gap on the basis of a status of the lock.

Optionally, the sensor arrangement comprises a sensor that is configured to output a signal in dependence on a position of the member relative to the gap.

Optionally, the sensor is configured to sense a state of the lock and to output the signal in dependence on whether the lock is in the locked state or the unlocked state.

Optionally, the sensor is configured to output the signal when the lock is in the locked state. Optionally, the sensor is configured to output the signal when the lock is in the unlocked state. Optionally, the sensor is configured to output the signal when the lock is in the locked and unlocked states, and the signal differs depending on whether the lock is in the locked or unlocked state.

Optionally, the sensor comprises a proximity sensor.

Optionally, the proximity sensor is configured to sense a proximity of the lock to the proximity sensor and to output the signal in dependence on the proximity of the lock to the proximity sensor.

Optionally, the uplock arrangement comprises a controller, wherein the sensor arrangement is communicably connected to the controller and configured to send the signal to the controller, and wherein the controller is configured to determine an integrity of the uplock arrangement based on the signal.

Optionally, the controller is configured to determine that there is a fault with the uplock arrangement when the signal indicates that the lock is in the unlocked state but no action to cause the lock to be currently in the unlocked state has been taken by the controller.

Optionally, the controller is configured to take an action when it is so determined that there is a fault with the uplock arrangement. Optionally, the action comprises causing an alert to be issued to the cockpit. Optionally, the action comprises causing an identifier of the fault to be recorded in memory connected to the controller.

Optionally, the locked and unlocked states of the lock are respective locked and unlocked positions of the lock relative to the hook.

Optionally, the lock is rotatable between the locked and unlocked positions.

Optionally, the uplock arrangement comprises a lock biasing device that is configured to bias the lock to the unlocked position, and a hook biasing device that is configured to bias the hook to the second position, wherein the lock biasing device is separate from the hook biasing device.

Optionally, the hook is movable between the first and second positions independently of changing of the lock to the locked state.

A second aspect of the present invention provides a landing gear system, comprising the uplock arrangement according to the first aspect of the present invention.

Optionally, the landing gear system comprises: a landing gear that is movable between a retracted position and an extended position; wherein the hook of the uplock arrangement is movable between the first position, at which the hook is for retaining a movable element of the landing gear in the gap, and a second position, in which the hook is for permitting movement of the element of the landing gear into and out from the gap.

Optionally, the landing gear system comprises: a landing gear that is movable between a retracted position and an extended position, wherein the landing gear is at least partially positioned in a landing gear bay when in the retracted position; and a landing gear bay door that is movable between a closed position, at which the landing gear bay door at least partially covers the landing gear bay, and an open position, at which movement of the landing gear between the extended position and the retracted position is permitted; wherein the hook of the uplock arrangement is movable between the first position, at which the hook is for retaining an element of the landing gear bay door in the gap, and a second position, in which the hook is for permitting movement of the element of the landing gear bay door into and out from the gap.

Optionally, the element comprises a rotatable element. Optionally, the rotatable element comprises a roller. Optionally, the element is a non-rotatable element, such as a pin.

A third aspect of the present invention provides an uplock arrangement for an aircraft landing gear, the uplock arrangement comprising: an engager that is changeable between a first state, at which the engager is configured to engage with a part of a landing gear system, and a second state, at which the engager is configured to disengage from the part of the landing gear system; a retainer that is changeable between a locked state, in which the retainer prevents change of the engager from the first state to the second state, and an unlocked state, in which the retainer permits change of the engager from the first state to the second state; and a linkage configured to cause the retainer to change from the locked state to the unlocked state, in the event that the part of the landing gear system becomes disengaged from the engager.

A fourth aspect of the present invention provides an aircraft comprising at least one uplock arrangement according to the first or third aspect of the present invention or comprising at least one landing gear system according to the second aspect of the present invention.

BRIEF DESCRIPTION OF THE DRAWINGS

Embodiments of the invention will now be described, by way of example only, with reference to the accompanying drawings, in which.

DETAILED DESCRIPTION

A landing gear bay door uplock arrangement may comprise a hook for retaining a movable element of a landing gear bay door. A bend, breakage or other failure of the hook, or of the movable element, may result in the movable element no longer being retained by the hook. As a result, the landing gear bay door may move under gravity from the closed position towards the open position. This could result in the door being positioned in the air flow around the aircraft. In turn, this may result in reduced aircraft performance, and increase the risk of damage to the door and the landing gear that is stowed in the landing gear bay with which the door is associated.

A landing gear uplock arrangement may comprise a hook for retaining a movable element of a landing gear. A bend, breakage or other failure of the hook, or of the movable element, may result in the movable element no longer being retained by the hook. As a result, the landing gear may move under gravity to rest on the landing gear bay door. Whilst the landing gear bay door often is designed to withstand the weight of the landing gear in such a scenario, a simultaneous failure in the landing gear bay door whilst the landing gear is resting on the landing gear bay door may result in an un-commanded extension of the landing gear.

It would, therefore, be advantageous to provide a mechanism for detecting such a failure of a hook of an uplock arrangement, or failure of a movable element for engaging with the hook. Such a mechanism may usable to inform a maintenance crew of the failure, so that the hook or element may be repaired or replaced at the next available opportunity. Additionally, or alternatively, such a mechanism may be usable to inform the flight crew, so that they can take appropriate action. Such action may, for example, comprise contacting a maintenance crew at an intended destination during a flight, causing operation of flight controls to compensate for any asymmetry that may be caused by an un-commanded landing gear extension, or causing operation of one or more actuators to hold a landing gear or landing gear bay door in a retracted or closed position, respectively.

Figure 1:
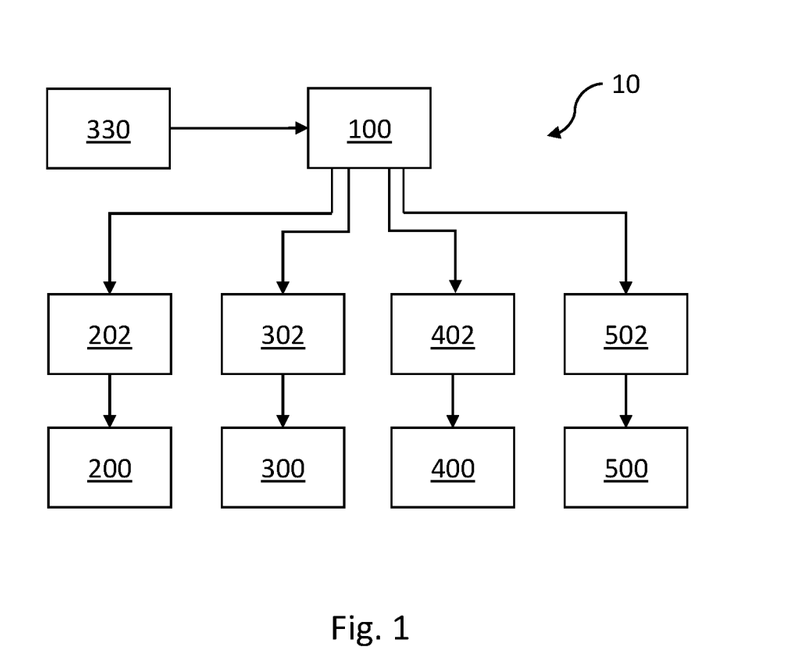
FIG. 1 is a schematic view of a landing gear system.

FIG. 1 shows a schematic view of a landing gear system. The landing gear system 10 comprises a landing gear bay door 200 and associated landing gear bay door actuator 202, a landing gear bay door uplock arrangement 300 and associated landing gear bay door uplock arrangement actuator 302, a landing gear 400 and associated landing gear actuator 402, and a landing gear uplock arrangement 500 and associated landing gear uplock arrangement actuator 502. The landing gear 300 is movable between a retracted position and an extended position. The landing gear bay door 500 is movable between a closed position and an open position. The landing gear system 10 also comprises a sensor arrangement 330 and a controller 100 that is operatively connected to each of the actuators 202, 302, 402, 502 and communicably connected to the sensor arrangement 330.

The landing gear bay door 200 is associated with a landing gear bay (not shown). The landing gear bay door 200 at least partially covers the landing gear bay when in the closed position. The landing gear 400 is at least partially positioned in the landing gear bay when in the retracted position. This way, the landing gear bay door 200 helps to protect the landing gear bay, and the landing gear 500 when stowed in the bay, from debris that might be thrown towards the bay while the aircraft is moving on the ground or in flight. Moreover, the landing gear bay door 200 helps to reduce drag (i.e. create an aerodynamically-cleaner aircraft). The landing gear bay door 200 is movable to the open position, at which movement of the landing gear 400 between the extended position and the retracted position is permitted.

The landing gear bay door actuator 202 is for moving the landing gear bay door 200 from the closed position to the open position, to permit movement of the landing gear 500 between the extended position and the retracted position. The landing gear bay door actuator 202 may be hydraulically-actuated, electro-hydraulically-actuated, electrically-actuated lock, or mechanically-actuated, for example. The landing gear bay door actuator 202 may also be for moving the landing gear bay door 200 from the open position to the closed position, or an alternative mechanism may be provided for such closure.

The landing gear bay door uplock arrangement 300 is for retaining the landing gear bay door 200 in the closed position, and will be described in more detail below. In some cases, the landing gear bay door uplock arrangement 300 may be omitted. For example, the landing gear bay door 200 may be held in the closed position by the landing gear bay door actuator 202 or by a mechanical linkage (such as a re-erecting lock stay). This may be the case when the landing gear uplock arrangement 500 (discussed below) is provided.

The landing gear bay door uplock arrangement actuator 302 is for moving a lock 320 of the landing gear bay door uplock arrangement 300 from a locked state to an unlocked state. The landing gear bay door uplock arrangement actuator 302 may be hydraulically-actuated, electro-hydraulically-actuated, electrically-actuated lock, or mechanically-actuated, for example. The landing gear bay door uplock arrangement actuator 302 may be depressurised when the lock is in the locked state, so that the actuator 302 is relatively freely movable. A spring may be provided to bias the position of the actuator 302 when it is unpressurised.

The landing gear actuator 402 is for moving the landing gear 400 from the extended position to the retracted position. The landing gear actuator 402 may be hydraulically-actuated, electro-hydraulically-actuated, electrically-actuated lock, or mechanically-actuated, for example. The landing gear actuator 402 may also be for moving the landing gear 400 from the retracted position to the extended position, or an alternative mechanism may be provided for such extension.

The landing gear uplock arrangement 500 is for retaining the landing gear 400 in the retracted position, and will be described in more detail below. In some cases, the landing gear uplock arrangement 500 may be omitted. For example, the landing gear 400 may be held in the retracted position by the landing gear actuator 402 or by a mechanical linkage (such as a re-erecting lock stay). This may be the case when the landing gear bay door uplock arrangement 300 is provided.

The landing gear uplock arrangement actuator 502 is for moving a lock 320 of the landing gear uplock arrangement 500 from a locked state to an unlocked state. The landing gear uplock arrangement actuator 502 may be hydraulically-actuated, electro-hydraulically-actuated, electrically-actuated lock, or mechanically-actuated, for example. The landing gear uplock arrangement actuator 502 may be depressurised when the lock is in the locked state, so that the actuator 502 is freely movable. A spring may be provided to bias the position of the actuator 502 when it is unpressurised.

The controller 100 is configured to cause actuation of the actuators 202, 302, 402, 502 to move the landing gear bay door 200, the lock 320 of the landing gear bay door uplock arrangement 300, the landing gear 400, and the lock 320 of the landing gear uplock arrangement 500 as required, for example in response to commands inputted into cockpit flight controls of the aircraft by flight crew.

Figure 2:
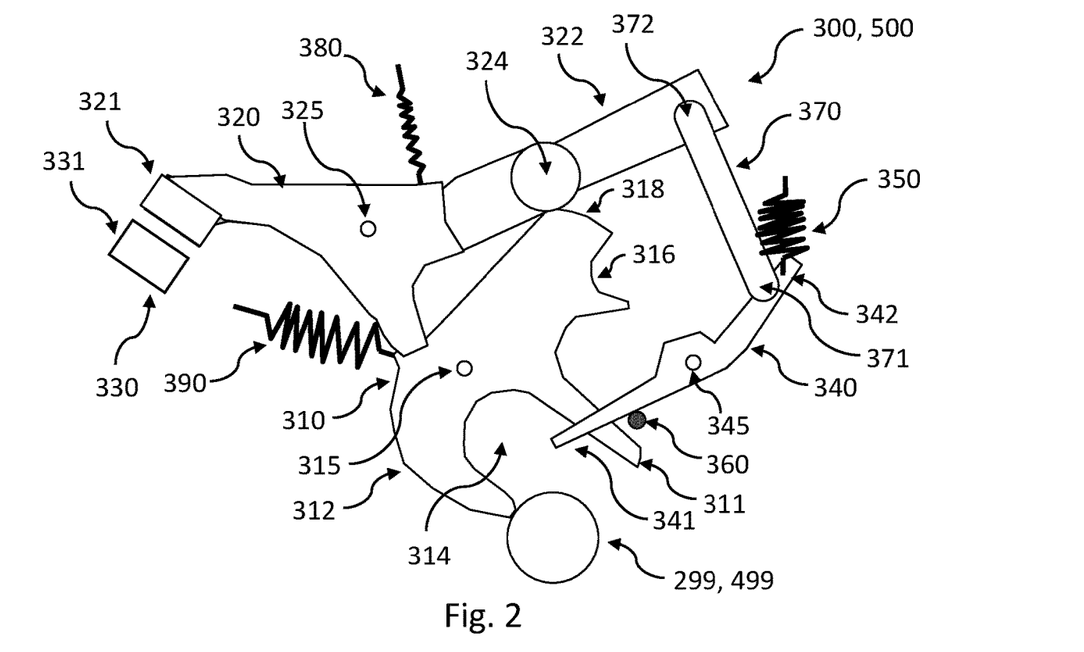
FIG. 2 is a schematic view of an uplock arrangement of the landing gear system of FIG. 1, in which a hook of the uplock arrangement is in a second position.
Figure 3:
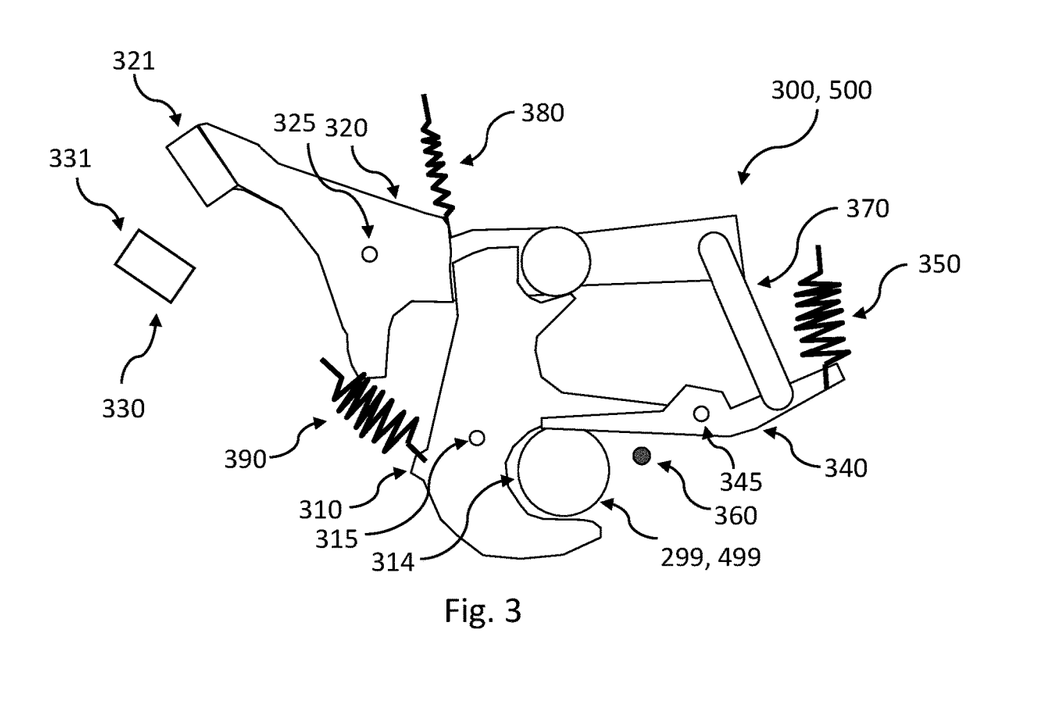
FIG. 3 is a schematic view of the uplock arrangement of FIG. 2, in which the hook of the uplock arrangement is in a first position.

FIG. 2 is a schematic view of an uplock arrangement of the landing gear system 10 of FIG. 1, in which a hook or engager 310 of the uplock arrangement is in a second position or second state, whereas FIG. 3 is a schematic view of the uplock arrangement of FIG. 2 but with the hook or engager 310 of the uplock arrangement 300, 500 in a first position or first state. The uplock arrangement in FIGS. 2 and 3 may be the landing gear bay door uplock arrangement 300 or the landing gear uplock arrangement 500.

The uplock arrangement 300, 500 comprises the hook 310, and the hook 310 defines a gap 314. More particularly, the hook 310 has first and second arms 311, 312 that define the gap 314. The hook 310 is movable between the first position (see FIG. 3), at which the hook 310 is for retaining a movable element 299, 499 of the landing gear system 10 in the gap 314, and the second position (see FIG. 2), at which the hook 310 is for permitting movement of the element 299, 499 into and out from the gap 314. The first and second positions may be considered locked and unlocked positions of the hook 310, respectively. In cases when the uplock arrangement is the landing gear bay door uplock arrangement 300, the movable element 299 is an element of the landing gear bay door 200, such as a rotationally-mounted roller or other rotatable element, or a non-rotatable element such as a pin. In cases when the uplock arrangement is the landing gear uplock arrangement 500, the movable element 499 is an element of the landing gear 400, such as a rotationally-mounted roller or other rotatable element, or a non-rotatable element such as a pin.

The hook 310 is rotatable between the first and second positions about a hook pivot 315. The uplock arrangement 300, 500 comprises a hook biasing device 390 that is configured to bias the hook 310 to the second position, shown in FIG. 2. That is, the hook biasing device 390 is configured to act on the hook 310 to tend to cause the hook 310 to rotate about the hook pivot 315 to the second position. In some cases, the hook biasing device 390 may be omitted.

The uplock arrangement 300, 500 also comprises a lock, retainer or latch 320. The lock 320 interacts with the hook 310. More specifically, the lock 320 is changeable between a locked state (see FIG. 3), in which the lock or retainer 320 retains the hook or engager 310 in the first state to prevents movement of the hook 310 from the first position to the second position, and an unlocked state (see FIG. 2), in which the lock 320 permits movement of the hook 310 from the first position to the second position. The uplock arrangement actuator 302, 502 may be connected to the lock 320 and configured to move the lock 320 from the locked state to the unlocked state when actuated. As noted above, the controller 100 is configured to cause such actuation of the actuator 302, 502.

In this example, the lock 320 is movable relative to the hook 310. More specifically, the locked and unlocked states of the lock 320 are respective locked and unlocked positions of the lock 320 relative to the hook 310. In this example, the lock 320 is rotatable between the locked and unlocked positions about a lock pivot 325. First and second portions 321, 322 of the lock 320 are located on respective sides of the lock pivot 325. In this example, the hook 310 comprises an engagement element, such as a recess, 316 with which an engagement device, such as a pin or peg or rotatable element, 324 of the lock 320 is engageable to lock the hook 310 in the first position when the lock 320 is in the locked position. The engagement device 324 is comprised in the second portion 322 of the lock 320, in this example.

The uplock arrangement 300, 500 comprises a lock biasing device 380 that is configured to bias the lock 320 to the unlocked position, shown in FIG. 2. That is, the lock biasing device 380 is configured to act on the lock 320 to tend to cause the lock 320 to rotate about the lock pivot 325 to the unlocked position. In this example, the lock biasing device 380 is engaged with the second portion 322 of the lock 320. The lock biasing device 380 is separate from the hook biasing device 390. More specifically, the hook biasing device 390 is not operatively connected to the lock 320. In some cases, the lock biasing device 380 may be omitted.

The hook 310 is movable between the first and second positions without causing movement of the lock 320. More specifically, the hook is movable between the first and second positions independently of changing of the lock 320 to the locked state. Movement of the lock 320 to the locked state is caused by a different mechanism, as will now be described.

The uplock arrangement 300, 500 comprises a member 340 that is connected to the lock 320 by a link 370. The member 340 is rigid. The member 340 and the link 370 may together be termed a linkage. The link 370 is pivotally connected to the member 340 at a first pivot 371 and pivotally connected to the lock 320 at a second pivot 372. The link 370 in this example is a rigid link. The member 340 comprises a first portion 341 and a second portion 342 on respective sides of a member pivot 345 about which the member 340 is rotatable. The first pivot 371 is at the second portion 342 of the member 340. That is, the link 370 is directly pivotally connected to the second portion 342 of the member 340. On the other hand, the link 370 also is directly pivotally connected to the second portion 322 of the lock 320.

At least part of the first portion 341 of the member 340, which may be in the form of an arm, is able to protrude into the gap 314 of the hook 310 or is able to be aligned or overly the gap 314. The uplock arrangement 300, 500 comprises a stop 360 that is configured to limit a degree to which the member 340 is able to move relative to the gap 314. The stop acts to control the extent to which the member 340 is rotatable about the member pivot 345. In this example, the stop is configured to act on the first portion 341 of the member 340. In other words, the stop is configured to contact the first portion 341 of the member 340 to limit a degree to which the member 340 is able to move relative to the gap 314. The uplock arrangement 300, 500 also comprises a member biasing device 350 that is configured to bias the member 340 relative to the gap 314. More specifically, the member biasing device 350 is configured to bias the member 340 to protrude into the gap 314 or to be aligned or overly the gap 314. In this example, the member biasing device 350 is engaged with the second portion 341 of the member 340.

The uplock arrangement 300, 500 is configured so that, as the element 299, 499 enters the gap 314, for example as driven by the landing gear bay door actuator 202 or the landing gear actuator 402 respectively, the element 299, 499 contacts the first arm 311 of the hook 310 and exerts a force on the hook 310 that tends to rotate the hook 310 against the bias of the hook biasing device 390, anticlockwise as FIG. 2 is drawn. During this movement, the engagement device 324 of the lock 320 and a surface 318 of the hook 310 adjacent the engagement element 316 of the hook 310 move relative to each other so that the engagement device 324 follows the surface 318. This continues during rotation of the hook 310 until the engagement device 324 passes an end of the hook surface 318 and is then free to move into the engagement element 316 of the hook 310.

The member 340 is rotatable about the member pivot 345 and relative to the gap 314 by the element 299, 499, when the element 299, 499 is in, or moving into, the gap 314. That is, movement of the element 299, 499 in, or into, the gap 314 causes the element 299, 499 to contact the member 340 and move the member 340 relative to the gap 314 against the bias of the member biasing device 350. This movement of the member 340 is clockwise as FIG. 2 is drawn.

The member 340 is operatively connected to the lock 320 by the link 370, so that movement of the member 340 relative to the gap 314 causes operation of the lock 320. More specifically, the rotation of the member 340 caused by the element 299, 499 pulls the link 370. In turn, this causes the link 370 to pull the second portion 322 of the lock 320, which causes the lock 320 to rotate against the bias of the lock biasing device 380. This movement of the lock 320 is clockwise as FIG. 2 is drawn. The uplock arrangement 300, 500 is configured so that the engagement device 324 has passed the end of the hook surface 318 by this stage. Therefore, the lock 320 is able to rotate from the unlocked position under the influence of the pulling force exerted by the link 370 on the lock 320. This causes the engagement device 324 to engage with the engagement element 316, and thereby lock the hook 310 in position. At this stage, which is shown in FIG. 3, the lock 320 is in the locked state and the hook 310 is in the first position, at which the hook 310 retains the movable element 299, 499 of the landing gear system in the gap 314. As such, the member 340 is operatively connected to the lock 320 so that movement of the member 340 in a direction out of the gap 314 causes the lock 320 to change to the locked state. For the avoidance of doubt, in some examples the member 340 may not have completely vacated the gap 314 when the lock 320 is in the locked state and the hook 310 is in the first position. In other examples, the member 340 may have completely vacated the gap 314 when the lock 320 is in the locked state and the hook 310 is in the first position.

The uplock arrangement 300, 500 comprises a sensor arrangement or detector 330 that is configured to sense whether the element 299, 499 is present in the gap 314. That is, the detector is configured to detect whether the part 299, 499 of the landing gear system is engaged with the engager 310. If the hook 310, such as the second arm 312 of the hook 310, or the element 299, 499 were to break or bend or otherwise fail in such a manner that the element 299, 499 can leave the gap 314, or if the uplock were to be operated without the element 299, 499 having been captured in the gap 314, then the sensor arrangement 330 is configured to sense the absence of the element 299, 499 from the gap 314.

In this example, the sensor arrangement 330 comprises a sensor 331 that is configured to output a signal in dependence on a position of the member 340 relative to the gap 314. More specifically, as the position of the member 340 is tied to the state of the lock 320, the sensor 331 is configured to sense a state of the lock 320 and to output the signal in dependence on whether the lock 320 is in the locked state or the unlocked state. The sensor 331 may be configured to output the signal only when the lock 320 is in the locked state. The sensor 331 may be configured to output the signal only when the lock 320 is in the unlocked state. The sensor 331 may be configured to output the signal when the lock 320 is in the locked and unlocked states, in which case the signal would differ depending on whether the lock 320 is in the locked or unlocked state.

In this example, the sensor 331 is, or comprises, a proximity sensor. The proximity sensor 331 of this example is configured to sense a proximity of the lock 320 to the proximity sensor 331, and to output the signal in dependence on the proximity of the lock 320 to the proximity sensor 331. More specifically, in this example the proximity sensor 331 is configured to sense a proximity of the first end 321 of the lock 320 to the proximity sensor 331.

As mentioned above, the uplock arrangement actuator 302, 502 may be depressurised when the lock 320 is in the locked state. If the hook 310, such as the second arm 312 of the hook 310, or the element 299, 499 were to break or bend or otherwise fail in such a manner that the element 299, 499 were to leave the gap 314, for example under the influence of gravity, then the lock 320 would move to the unlocked position. More specifically, as there would be no movable element 299, 499 in the gap 314 to displace the member 340 from the stop 360, the member 340 and the lock 320 would be free to rotate, anticlockwise as FIG. 3 is drawn, back to the state shown in FIG. 2 under the biasing force of the biasing devices 350, 380, 390. As noted above, this rotation would be limited or controlled by the interaction of the stop 360 and the member 340. The combination of the member 340 and the link 370 may therefore be considered a linkage that is configured to cause the lock 320 to change from the locked state to the unlocked state, in the event that the part 299, 499 of the landing gear system becomes disengaged from the hook 310. This may be as a result of the hook 310 failing in such a way as to cause the part 299, 499 of the landing gear system to disengage from the hook 310. Alternatively, or additionally, this may be as a result of a failure of the part of the part 299, 499 of the landing gear system. Such rotation of the lock 320 in this example causes a change in a distance between the lock 320 and the proximity sensor 331, which is detectable by the sensor 331. The signal output by the sensor 331 would then indicate that the lock 320 is in the unlocked state. In other words, the sensor arrangement 330 is for sensing whether the element 299, 499 is present in the gap 314 based on a status of the lock 320.

The sensor arrangement 330, and particularly the sensor 331, may be communicably connected to the controller 100, so that the signal from the sensor 331 is receivable by the controller 100. The controller 100 may be configured to determine an integrity of the uplock arrangement 300, 500 based on the signal. The controller 100 may be configured to determine that there is a fault with the uplock arrangement 300, 500 when the signal indicates that the lock 320 is in the unlocked state but no action to cause the lock 320 to be currently in the unlocked state has been taken by the controller 100. It is particularly advantageous to use just one sensor arrangement 330 for both determining the status of the lock 320 and determining whether the hook 310 has failed, since this keeps the weight and complexity of the landing gear system 10 down as compared to instead having respective separate sensors, and potentially associated wiring, for these two functions.

The controller 100 may be configured to take an action when it is so determined that there is a fault with the uplock arrangement 300, 500. The action may comprise causing an alert (such as visual, audible or haptic) to be issued to the cockpit. The flight crew are then able to determine what action should be taken, such as contacting a maintenance crew at an intended destination during a flight to alert them, causing operation of flight controls to compensate for any asymmetry that may have been caused by an un-commanded landing gear extension resulting from the fault, or causing operation of one or both of the actuators 202, 402 to hold a landing gear or landing gear bay door in a retracted or closed position, respectively. The action may comprise causing an identifier of the fault to be recorded in memory connected to the controller 100, for subsequent identification by a maintenance crew. The maintenance crew are then able to determine what action should be taken, such as inspection of the uplock arrangement 300, 500 and potentially repair or replacement of the hook 310.

Figure 4:
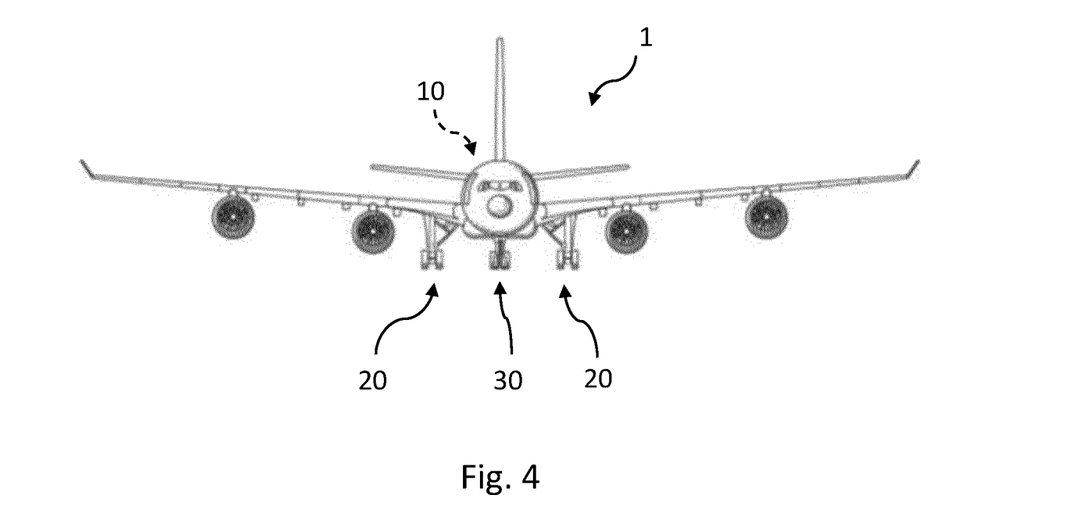
FIG. 4 is a schematic front view of an aircraft.

FIG. 4 is a schematic front view of an aircraft 1. The aircraft 1 comprises two main landing gears 20 and a nose landing gear 30. The aircraft 1 also comprises a landing gear system as discussed herein, such as the system 10 discussed herein with reference to FIGS. 1 to 3. The aircraft 1 therefore comprises the uplock arrangement 300 and/or the uplock arrangement 500.

It is to be noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:
1. A landing gear system uplock arrangement comprising:
 a hook defining a gap, wherein the hook is movable between a first position, at which the hook retains a movable element of a landing gear system in the gap, and a second position, at which the hook permits movement of the element into and out from the gap;

a lock changeable between a locked state, in which the lock prevents movement of the hook from the first position to the second position, and an unlocked state, in which the lock permits movement of the hook from the first position to the second position;

a sensor arrangement configured to sense whether the element is present in the gap, and a member moveable relative to both the gap and the hook by the moveable element when the moveable element is in the gap, wherein the member is operatively connected to the lock so that movement of the member relative to the gap operates the lock.

2. The uplock arrangement according to claim 1, wherein the member is rotatable relative to the gap by the element when the element is in the gap.

3. The uplock arrangement according to claim 1, comprising a member biasing device configured to bias the member relative to the gap.

4. The uplock arrangement according to claim 3, comprising a stop configured to limit a degree to which the member moves relative to the gap.

5. The uplock arrangement according to claim 1, wherein the member is operatively connected to the lock so that movement of the member in a direction away from the gap causes the lock to change to the locked state.

6. The uplock arrangement according to claim 1, wherein the sensor arrangement is configured to sense whether the moveable element is present in the gap on the basis of a status of the lock.

7. The uplock arrangement according to claim 1, wherein the sensor arrangement comprises a sensor that is configured to output a signal in dependence on a position of the member relative to the gap.

8. The uplock arrangement according to claim 7, wherein the sensor is configured to sense a state of the lock and to output the signal in dependence on whether the lock is in the locked state or the unlocked state.

9. The uplock arrangement according to claim 7, wherein the sensor comprises a proximity sensor.

10. The uplock arrangement according to claim 7, further comprising a controller, wherein the sensor arrangement is communicably connected to the controller and configured to send the signal to the controller, and wherein the controller is configured to determine an integrity of the uplock arrangement based on the signal.

11. The uplock arrangement according to claim 1, wherein the locked and unlocked states of the lock are respective locked and unlocked positions of the lock relative to the hook.

12. The uplock arrangement according to claim 11, comprising a lock biasing device that is configured to bias the lock to the unlocked position, and a hook biasing device that is configured to bias the hook to the second position, wherein the lock biasing device is separate from the hook biasing device.

13. The uplock arrangement according to claim 1, wherein the hook is movable between the first and second positions independently of changing of the lock to the locked state.

14. An aircraft comprising at least one uplock arrangement according to claim 1.

15. The landing gear system uplock arrangement according to claim 1, wherein the member is a lever pivotable about an axis which does not extend through the hook.

16. The landing gear system uplock arrangement according to claim 15, wherein the member has a first arm configured to engage the moveable element and a second arm with a joint linked to the lock, wherein the second arm is on a side of the member opposite to the axis.

17. A landing gear system comprising:
a landing gear system uplock arrangement, the landing gear system uplock arrangement comprising:
a hook defining a gap, wherein the hook is movable between a first position, at which the hook is for retaining a movable element of a landing gear system in the gap, and a second position, at which the hook is for permitting movement of the element into and out from the gap;
a lock changeable between a locked state, in which the lock prevents movement of the hook from the first position to the second position, and an unlocked state, in which the lock permits movement of the hook from the first position to the second position;
a sensor arrangement for sensing whether the element is present in the gap, and
a member separate from the hook and moveable relative to both the gap and the hook by the moveable element when the moveable element is in the gap, wherein the member is operatively connected to the lock so that movement of the member relative to the gap moves the lock between the locked state and the unlocked state.

18. The landing gear system according to claim 17, further comprising:
a landing gear movable between a retracted position and an extended position;
wherein the hook of the uplock arrangement is movable between the first position, at which the hook is for retaining a movable element of the landing gear in the gap, and a second position, in which the hook is for permitting movement of the element of the landing gear into and out from the gap.

19. The landing gear system according to claim 17, further comprising:
a landing gear that is movable between a retracted position and an extended position, wherein the landing gear is at least partially positioned in a landing gear bay when in the retracted position; and
a landing gear bay door that is moveable between a closed position, at which the landing gear bay door at least partially covers the landing gear bay, and an open position, at which movement of the landing gear between the extended position and the retracted position is permitted;
wherein the hook of the uplock arrangement is movable between the first position, at which the hook is for retaining an element of the landing gear bay door in the gap, and a second position, in which the hook is for permitting movement of the element of the landing gear bay door into and out from the gap.

20. An uplock arrangement for an aircraft landing gear, the uplock arrangement comprising:
an engager changeable between a first state, at which the engager is configured to engage with a part of a landing gear system, and a second state, at which the engager is configured to disengage from the part of the landing gear system;
a retainer changeable between a locked state, in which the retainer prevents change of the engager from the first state to the second state, and an unlocked state, in which the retainer permits change of the engager from the first state to the second state;

a linkage configured to cause the retainer to change from the locked state to the unlocked state, in response to the part of the landing gear system disengaging from the engager, and a member separate from the engager and moveable relative to both the engager and a gap in the engager when the part is in the gap, wherein the member is operatively connected to the linkage so that movement of the member relative to the gap moves the linkage to cause the retainer to change from the locked state to the unlocked state.

* * * * *